(12) United States Patent
Ukechi et al.

(10) Patent No.: US 6,647,184 B2
(45) Date of Patent: Nov. 11, 2003

(54) OPTICAL WAVEGUIDE DEVICE AND METHOD OF MANUFACTURING THE SAME

(75) Inventors: Mitsuo Ukechi, Tokyo (JP); Takuya Miyashita, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 63 days.

(21) Appl. No.: 10/053,020

(22) Filed: Jan. 18, 2002

(65) Prior Publication Data

US 2002/0097963 A1 Jul. 25, 2002

(30) Foreign Application Priority Data

Jan. 19, 2001 (JP) .......................... 2001-012193

(51) Int. Cl.[7] ............... G02B 6/26; G02B 6/30
(52) U.S. Cl. ............... 385/47; 385/45; 385/49; 385/50; 385/52
(58) Field of Search ............... 385/45–52, 88, 385/89, 92

(56) References Cited

U.S. PATENT DOCUMENTS 6,085,000 A * 7/2000 Tanaka et al. ............ 385/45

2002/0048431 A1 * 4/2002 Kimura .................... 385/47

* cited by examiner

Primary Examiner—Hemang Sanghavi
(74) Attorney, Agent, or Firm—David N. Lathrop, Esq.; Gallagher & Lathrop

(57) ABSTRACT

There are provided an optical waveguide device in which a plurality of PLC type optical waveguide chips are optically coupled to one another at high accuracy by passive alignment, and a method of manufacturing the device. A plurality of optical waveguide chips are formed by cutting an optical waveguide device comprising an optical waveguide substrate having an optical waveguide of a predetermined pattern formed thereon and guide grooves formed on both sides of the optical waveguide on the optical waveguide substrate in the longitudinal direction thereof, in the direction of traversing the optical waveguide substrate at substantially right angle thereto and passing through an intersection of the optical waveguide. After a dielectric multilayer film filter is provided on an end surface of at least one of the optical waveguide chips, on which the intersection of the optical waveguide is exposing, guide pins are fitted in the guide grooves of each of the plurality of optical waveguide chips in the state that the filter is put between adjoining two chips, thereby to align the chips with one another. In such aligned state, the chips are brought into contact with one another through the filter and are fixed.

18 Claims, 6 Drawing Sheets

OPTICAL WAVEGUIDE DEVICE AND METHOD OF MANUFACTURING THE SAME

BACKGROUND OF THE INVENTION

1. Field of the Invention

The present invention relates to a PLC (planar light wave circuit) type optical waveguide device comprising a planar optical waveguide substrate and an optical waveguide formed on the optical waveguide substrate, and a method of manufacturing the optical waveguide device, and more particularly, to an optical waveguide device formed by coupling a plurality of PLC type optical waveguide chips, and a method of manufacturing such optical waveguide device.

2. Description of the Related Art

At first, an example of the PLC type optical waveguide device comprising a planar optical waveguide substrate and an optical waveguide formed on the optical waveguide substrate will be described with reference to FIG. 1.

FIG. 1 is a perspective view showing, in outline, the construction of a PLC type optical waveguide device disclosed in Japanese Patent Application No. 28278/2000 filed on Feb. 4, 2000 by the same assignee as that of the present application. The optical waveguide device 30 comprises: an optical waveguide substrate 31 of generally rectangular shape in plan and made of, for example, silicon (Si); a generally "y"-shaped optical waveguide 2 made of glass layer or organic material thin film and formed on the surface of the optical waveguide substrate 31; a clad layer 32 made of glass layer or organic material thin film and formed on the surface of the optical waveguide substrate 31 in such manner that the optical waveguide 2 is covered with the clad layer 32; and a light source 33 that is a laser diode in this example and a photodetector 34 that is a photodiode in this example mounted on the optical waveguide substrate 31 at the both sides thereof in the longitudinal direction thereof respectively. Further, in the figure, though the optical waveguide 2 is shown in the manner that the top surface thereof is exposed, in reality, the top surface of the optical waveguide 2 is also covered with the clad layer 32. In addition, a lower clad layer made of glass layer or organic material thin film has been formed under the optical waveguide 2. The optical waveguide 2 corresponds to the core of an optical fiber having high refractive index, and the lower clad layer and the clad layer 32 (upper clad layer) correspond to the clad of the optical fiber having low refractive index.

The "y"-shaped optical waveguide 2 is constituted by two optical waveguides, one of which is an optical waveguide that forms a generally straight line and extends from one end surface of the optical waveguide substrate 31 in the longitudinal direction thereof to the other end surface of the optical waveguide substrate 31 in the longitudinal direction thereof, the other end surface being opposed to the photodetector 34, and the other of which is an optical waveguide which is branched from the central portion of the aforesaid optical waveguide of generally straight line and extends to the end surface of the optical waveguide substrate 31 opposed to the light source 33. Herein, the optical waveguide branched from the central portion of the optical waveguide of generally straight line will be referred to as first optical waveguide 21, one portion of the optical waveguide of generally straight line extending from the intersection or junction with the first waveguide 21 to the aforesaid one end surface of the optical waveguide substrate 31 in the longitudinal direction thereof will be referred to as second waveguide 22, and the other portion of the optical waveguide of generally straight line extending from the intersection to the other end surface (opposed to the photodetector 34) of the optical waveguide substrate 31 in the longitudinal direction thereof will be referred to as third waveguide 23.

The light source 33 is mounted on the optical waveguide substrate 31 such that the light emitting portion thereof is opposed to one end (a portion exposed on the end surface of the clad layer 32) of the first optical waveguide 21. One end (a portion exposed on the end surface of the clad layer 32) of the second optical waveguide 22 is optically coupled to other optical waveguide (for example, an optical fiber) not shown. The photodetector 34 is mounted on the optical waveguide substrate 31 such that the light receiving portion thereof is opposed to one end (a portion exposed on the end surface of the clad layer 32) of the third optical waveguide 23.

Between the intersection of the first and second optical waveguides 21 and 22 and the other end of the third optical waveguide 23 is formed a slit or groove 35 across the optical waveguide substrate 31 at substantially a right angle thereto, the slit 35 extending from the surface of the clad layer 32 into the optical waveguide substrate 31. Accordingly, the intersection of the first and second optical waveguides 21 and 22 is disconnected and separated from the other end of the third optical waveguide 23 by the slit 35, and the intersection of the first and second optical waveguides 21 and 22 is opposed to the other end of the third optical waveguide 23 through the slit 35.

Further, in this example, the slit 35 was formed by dicing (diecutting), but it is needless to say that the slit 35 may be formed by other cutting process. In addition, the light source 33 and the photodetector 34 are mounted directly on the optical waveguide substrate 31. A sheet of glass or a thin film of organic material is used as the clad layer 32, the thickness of the clad layer 32 being set to a value between several micrometers and about 20 micrometers in view of its strength.

A dielectric multilayer film filter 36 is inserted into the slit 35 and is fixed to the clad layer 32 by use of an appropriate adhesive 37. As a result, the end surface of the third optical waveguide 23 is opposed to the end surface of the intersection of the first and second optical waveguides 21 and 22 through the dielectric multilayer film filter 36. Further, a process of making the optical waveguide 2 is described in detail in Japanese Patent Application No. 28278/2000 mentioned above, and the explanation thereof will be omitted here.

The optical waveguide device 30 constructed as described above operates as a WDM (wavelength division multiplexing) device. For example, when light L1 having its wavelength of 1.31 $\mu$m emitted from the light source 33 is incident on the end surface of the first optical waveguide 21, this light L1 propagates through the first optical waveguide 21 and is incident on the dielectric multilayer film filter 36. Since the characteristic of the dielectric multilayer film filter 36 is previously set such that it reflects light having its wavelength of 1.31 $\mu$m, the dielectric multilayer film filter 36 reflects the light L1 incident thereon and inputs the light L1 into the end surface of the second optical waveguide 22. Accordingly, the light L1 propagates through the second optical waveguide 22 and is emitted to the outside (or to other optical waveguide not shown) from the other end surface of the second optical waveguide 22. On the other hand, when light L2 having its wavelength of 1.55 $\mu$m is incident on the other end surface of the second optical waveguide 22 from the outside or other optical waveguide, this light L2 propagates through the second optical waveguide 22 and is incident on the dielectric multilayer film filter 36. Since the characteristic of the dielectric multilayer film filter 36 is previously set such that it transmits light having its wavelength of 1.55 μm, the dielectric multilayer film filter 36 transmits the light L2 incident thereon and inputs the light L2 into the end surface of the third optical waveguide 23. Accordingly, the light L2 propagates through the third optical waveguide 23 to the other end surface thereof and is incident on the photodetector 34. Thus, the above-mentioned optical waveguide device 30 operates as a WDM device.

In the optical waveguide device 30, in case the dielectric multilayer film filter 36 is thick in its thickness, a loss of light transmitted through the filter 36 is increased. Therefore, for the purpose of making the optical characteristic of the dielectric multilayer film filter 36 good, the thickness of the dielectric multilayer film filter 36 is decreased as far as possible (usually, the dielectric multilayer film filter 36 is made to have its thickness of 10 μm or so). However, it is impossible to make the loss of light transmitted through the filter 36 nothing (zero). In addition, the dielectric multilayer film filter 36 is inserted into the slit 35 for insertion of filter. In such case, it is required that the width of the slit 35 is broader by several μm than the thickness of the dielectric multilayer film filter 36 because the dielectric multilayer film filter 36 cannot be inserted into the slit 35 in reality if the slit 35 should not be broader in its width than the thickness of the filter 36 by several μm. Accordingly, the width of the slit 35 becomes considerably broader than the thickness of the filter 36 itself. As a result, in this respect, too, the loss of light is increased, and hence use of the dielectric multilayer film filter by inserting it into the slit has caused a disadvantage that the characteristic of the WDM device is deteriorated. Moreover, cutting process of the slit with high accuracy by dicing, and insertion and adhesion processes of the dielectric multilayer film filter need much time and prodigious labor as well as are lacking in mass production, which results in high manufacturing cost of the optical waveguide device.

In order to eliminate the disadvantages of the prior art described above, there is provided an optical waveguide device in which the optical waveguide device is cut at the position thereof into which a dielectric multilayer film filter is to be inserted, and the dielectric multilayer film filter is formed on an end surface of an optical waveguide by deposition of a dielectric multilayer film thereon. An example of the optical waveguide device of this type is shown in FIG. 2. Further, portions and elements in FIG. 2 corresponding to those in FIG. 1 will be denoted by the same reference characters affixed thereto, and the explanation thereof will be omitted unless it is necessary.

The optical waveguide device 40 shown in FIG. 2 is constituted by two optical waveguide chips 40A and 40B, and these two optical waveguide chips 40A and 40B are obtained, in this example, by cutting the optical waveguide device 30 shown in FIG. 1 in two exact halves at the position between the intersection of the first and second optical waveguides 21 and 22 and the other end of the third optical waveguide 23, that is, at the position into which the dielectric multilayer film filter 36 is to be inserted, across the optical waveguide substrate 31 at substantially a right angle thereto.

The first optical waveguide chip 40A that is one of the halves of the optical waveguide device 40 comprises: a half optical waveguide substrate 31 A; the first and second optical waveguides 21 and 22 of the optical waveguide 2 formed on the surface of the half optical waveguide substrate 31 A; a half clad layer 32A formed on the surface of the half optical waveguide substrate 31 A in such manner that these first and second optical waveguides 21 and 22 are covered with the half clad layer 32A; a dielectric multilayer film filter 41 formed by deposition of a dielectric multilayer film on an area of the end surface of the first optical waveguide chip 40A at the cut side thereof, the area including the intersection of the first and second optical waveguides 21 and 22 exposed on the end surface of the half clad layer 32A; and the light source 33 disposed to be opposed to the one end surface of the first optical waveguide 21. On the other hand, the second optical waveguide chip 40B that is the other of the halves of the optical waveguide device 40 comprises: a half optical waveguide substrate 31B; the third optical waveguide 23 of the optical waveguide 2 formed on the surface of the half optical waveguide substrate 31B; a half clad layer 32B formed on the surface of the half optical waveguide substrate 31 B in such manner that the third optical waveguide 23 is covered with the half clad layer 32B; and the photodetector 34 disposed to be opposed to the one end surface of the third optical waveguide 23.

The first optical waveguide chip 40A and the second optical waveguide chip 40B constructed respectively as described above are fixed to each other to obtain the optical waveguide device 40 after the intersection of the first and second optical waveguides 21 and 22 exposed on the end surface of the half clad layer 32A of the first chip 40A is opposed to the end surface of the third optical waveguide 23 exposed on the one end surface of the half clad layer 32B of the second chip 40B, and then, the mutual positioning between the intersection of the first and second optical waveguides 21 and 22 and the end surface of the third optical waveguide 23 is conducted such that the maximum quantity of light can be obtained.

The optical waveguide device 40 also operates as a WDM device like the optical waveguide device 30 shown in FIG. 1. For example, light L1 having its wavelength of 1.31 μm emitted from the light source 33 propagates through the first optical waveguide 21, is reflected by the dielectric multilayer film filter 41, propagates through the second optical waveguide 22, and is emitted to the outside. On the other hand, light L2 having its wavelength of 1.55 μm incident on the other end surface of the second optical waveguide 22 from the outside propagates through the second optical waveguide 22, passes through the dielectric multilayer film filter 41, propagates through the third optical waveguide 23, and is incident on the photodetector 34.

In such manner, in case of the prior optical waveguide device 40 shown in FIG. 2, the dielectric multilayer film filter 41 is formed directly on the area of the end surface of the half clad layer 32A including the intersection of the first and second optical waveguides 21 and 22. As a result, a loss of light is reduced, and the deterioration in the characteristic of the optical waveguide device can be fairly improved. In other words, the above-mentioned disadvantages resulting from the optical waveguide device 30 shown in FIG. 1 in which a slit is formed to insert a dielectric multilayer film filter thereinto and then the filter is fixed can be removed.

However, in the prior optical waveguide device 40 shown in FIG. 2, a process or procedure called active alignment in this technical field have to be used in case of aligning the first and second optical waveguides 21 and 22 with each other to obtain the maximum quantity of light and thereafter fixing them to each other.

In case of aligning the first and second optical waveguides 21 and 22 with each other and coupling them to each other by use of the active alignment process, the following process or procedure must be carried out, which comprises the steps of: inputting light from a light source not shown into the input end of the second optical waveguide 22 of the first optical waveguide chip 40A; inputting the light emitted from the output end of the second optical waveguide 22 through the dielectric multilayer film filter 41 into the input end of the third optical waveguide 23 of the second optical waveguide chip 40B; locating a position at which the maximum quantity of the light propagating through the third optical waveguide 23 can be obtained (usually, the second optical waveguide chip 40B is mounted on a X-Y-Z axis stage which is movable at high accuracy in the directions of three axes of X axis, Y axis and Z axis, and the position thereof is precisely adjusted to find a position at which the quantity of light received by the second optical waveguide chip 40B becomes maximum using an optical power meter connected to the output end of the third optical waveguide 23); and fixing both the optical waveguide chips 40A and 40B to each other.

The alignment process stated above is complicated and troublesome works, and further, the aforementioned X-Y-Z axis stage, the light source, the optical power meter, and the like have to be used. As a result, the manufacturing cost of the optical waveguide device comes to very high. In addition, in order to input light into the input end of the second optical waveguide 22 of the first optical waveguide chip 40A, it is necessary to couple between the light source not shown and the input end of the second optical waveguide 22 through an optical fiber, and in such case, the active alignment process must be also used. Likewise, in case of coupling between the output end of the third optical waveguide 23 of the second optical waveguide chip 40B and the power meter not shown through an optical fiber, the active alignment process must be used, too. Accordingly, there occurs a disadvantage that much time and prodigious labor are needed in order to align the two optical waveguide chips 40A and 40B with each other.

SUMMARY OF THE INVENTION

It is an object of the present invention to provide an optical waveguide device in which a plurality of PLC type optical waveguide chips are optically coupled with each other at high accuracy by a passive alignment process.

It is another object of the present invention to provide a method of manufacturing an optical waveguide device which comprises the steps of: cutting a PLC type optical waveguide device having an optical waveguide of a predetermined pattern formed on an optical waveguide substrate in a plurality of optical waveguide chips; providing a dielectric multilayer film filter on an exposed end surface of an optical waveguide of a predetermined one or more of the optical waveguide chips; and optically coupling two optical waveguide chips opposed to each other through the dielectric multilayer film filter therebetween by a passive alignment process.

In order to accomplish the foregoing objects, in one aspect of the present invention, there is provided a method of manufacturing an optical waveguide device comprising the steps of: forming an optical waveguide of a predetermined pattern on an optical waveguide substrate; forming at least one guide groove on the optical waveguide substrate in the longitudinal direction thereof; cutting the optical waveguide substrate having the optical waveguide and the guide groove formed thereon in the direction of traversing the optical waveguide substrate at substantially right angle thereto and passing through an intersection of the optical waveguide, thereby to form a plurality of optical waveguide chips; providing a dielectric multilayer film filter on an end surface of at least one of the optical waveguide chips, on which the intersection of the optical waveguide is exposing; fitting at least one guide pin in the guide groove of each of the plurality of optical waveguide chips in the state that the dielectric multilayer film filter is put between adjoining two optical waveguide chips, thereby to align the plurality of optical waveguide chips with one another; and bringing the aligned plurality of optical waveguide chips into contact with one another and fixing them.

In another aspect of the present invention, there is provided an optical waveguide device comprising: a plurality of optical waveguide chips formed by cutting an optical waveguide device comprising an optical waveguide substrate having an optical waveguide of a predetermined pattern formed thereon and at least one guide groove formed on the optical waveguide substrate in the longitudinal direction thereof, in the direction of traversing the optical waveguide substrate at substantially right angle thereto and passing through an intersection of the optical waveguide; a dielectric multilayer film filter provided on an end surface of at least one of the optical waveguide chips, on which the intersection of the optical waveguide is exposing; and fixing means fixing the plurality of optical waveguide chips aligned with one another by use of the guide groove in the state that they are in contact with one another through the dielectric multilayer film filter put between adjoining two optical waveguide chips.

In a preferred embodiment, the optical waveguide and the guide groove are formed using photolithography technique and etching technique. It is preferable that two guide grooves of generally "V"-shape in section are formed on both sides of the optical waveguide.

In addition, the guide groove of generally "V"-shape in section may be formed by forming a mask of a predetermined pattern made of quartz system material on the surface of a clad layer covering the optical waveguide therewith using photolithography technique and etching technique, and thereafter, applying an anisotropic etching using KOH liquid. Alternatively, the guide groove may be formed by dicing.

In another preferred embodiment, grooves for positioning optical fibers are formed on the surfaces of both end portions of the optical waveguide substrate in the longitudinal direction thereof, on which the optical waveguide is not formed, the grooves being formed on the surfaces of the both end portions in the longitudinal direction of the optical waveguide substrate in the state that they are aligned with exposed end surfaces of the optical waveguide respectively.

The dielectric multilayer film filter may be a filter that is formed by deposition of a dielectric multilayer film on an end surface of one of the optical waveguide chips, on which the intersection of the optical waveguide is exposing, or may be a dielectric multilayer filter of thin film that is fixed on an end surface of one of the optical waveguide chips, on which the intersection of the optical waveguide is exposing.

In accordance with the present invention, a plurality of separated optical waveguide chips can be aligned with and re-coupled to one another at high accuracy by passive alignment using at least one guide groove and guide pin. Consequently, a loss of light due to insertion of a dielectric multilayer film filter or filters becomes much small, and the characteristic of an optical waveguide device can be greatly improved. Moreover, since the passive alignment is used, it is unnecessary to use expensive apparatus and/or instruments, which results in reduction in manufacturing cost of an optical waveguide device. Furthermore, time and labor needed to manufacture an optical waveguide device can be remarkably reduced.

BRIEF DESCRIPTION OF THE DRAWINGS

FIG. 3 through FIG. 6 illustrate a method of manufacturing a first embodiment of the PLC type optical waveguide device according to the present invention in sequence of process steps thereof, wherein FIGS. 3, 4 and 6 are perspective views and FIG. 5 is a plan view;

DETAILED DESCRIPTION OF THE PREFERRED EMBODIMENTS

The preferred embodiments of the present invention will now be described in detail with reference to FIGS. 3 to 8. The present invention may, however, be embodied in many different forms and should not be construed as limited to the embodiments set forth hereinafter; rather, the embodiments are provided so that this disclosure will be thorough and complete, and will fully convey the scope of the invention to those skilled in the art.

Figure 1:
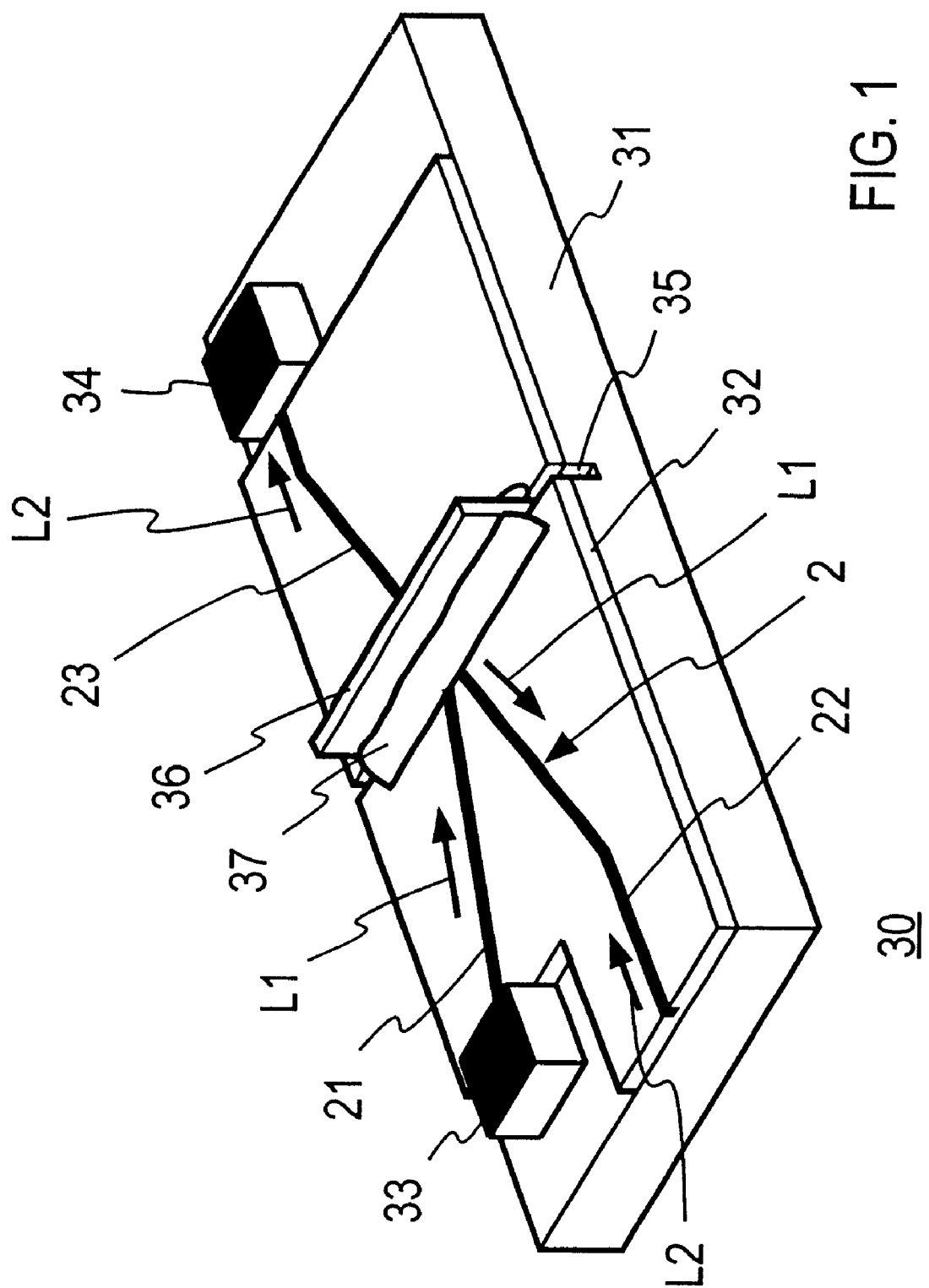
FIG. 1 is a perspective view showing, in outline, the construction of an example of the prior PLC type optical waveguide.
Figure 2:
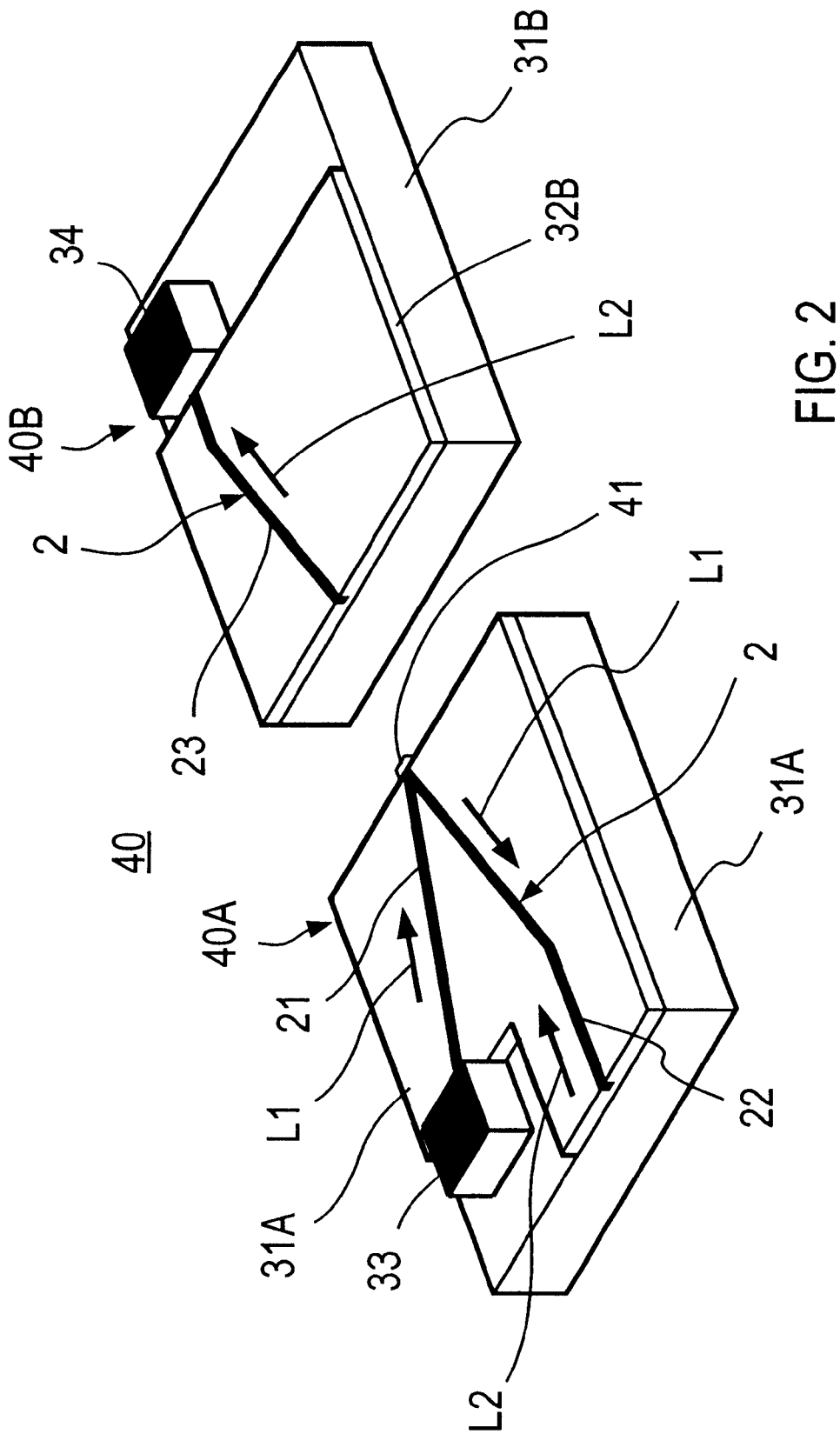
FIG. 2 is a perspective view showing, in outline, the construction of another example of the prior PLC type optical waveguide.

At first, a first embodiment of the PLC type optical waveguide device according to the present invention will be described in detail with reference to FIGS. 3 to 6. Further, portions and elements in FIGS. 3 to 6 corresponding to those in FIGS. 1 and 2 will be denoted by the same reference characters affixed thereto, and the explanation thereof will be omitted unless it is necessary.

Figure 3:
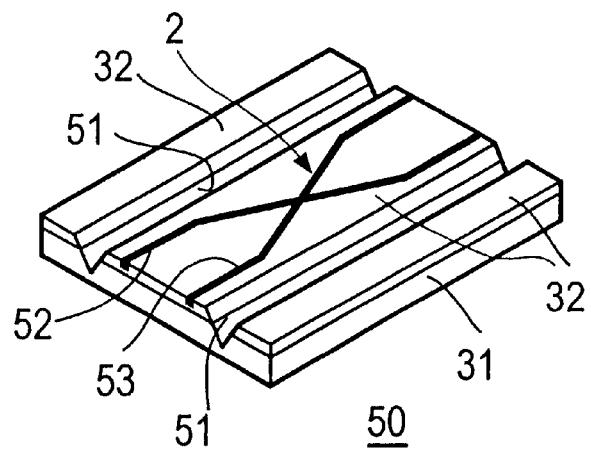

FIG. 3 is a perspective view showing, in outline, the construction of an example of the PLC type optical waveguide device that forms the basis of the present invention. This optical waveguide device 50 comprises: an optical waveguide substrate 31 of generally rectangular shape in plan and made of, for example, silicon (Si); a generally "X"-shaped optical waveguide 2 made of quartz system glass layer or polymer thin film and formed on the surface of the optical waveguide substrate 31; a clad layer 32 made of quartz system glass layer or polymer thin film and formed on the surface of the optical waveguide substrate 31 in such manner that the optical waveguide 2 is covered with the clad layer 32; and two guide grooves 51 of "V"-shape in section, in this example, formed on the optical waveguide substrate 31 along the longitudinal direction thereof on both sides of the generally "X"-shaped optical waveguide 2 in parallel with each other respectively. Further, in the figure, though the optical waveguide 2 is shown in the manner that the top surface thereof is exposed, in reality, the top surface of the optical waveguide 2 is also covered with the clad layer 32.

In addition, a lower clad layer made of quartz system glass layer or polymer thin film has been formed under the optical waveguide 2. The optical waveguide 2 corresponds to the core of an optical fiber having high refractive index, and the lower clad layer and the clad layer 32 (upper clad layer) correspond to the clad of the optical fiber having low refractive index.

The two "V"-shaped guide grooves 51 formed on the both sides of the optical waveguide 2 are penetrated in the optical waveguide substrate 31 from the top surface of the clad layer 32. The "V"-shaped guide grooves 51 can be formed by, for example, forming a mask of a predetermined pattern made of quartz system material on the surface of the clad layer 32 by application of photolithography technique and etching technique, and thereafter applying an anisotropic etching using KOH liquid. In this case, the accuracy of position of the two "V"-shaped guide grooves 51 is basically dependent upon the accuracy of the photolithography technique, and it is possible to obtain high accuracy equal to or smaller than 0.2 μm by use of an apparatus called stepper as an exposure apparatus regarding the accuracy of mutual position between the "V"-shaped guide grooves 51 and the optical waveguide 2. Further, the clad layer 32 existing on the outside areas of the "V"-shaped guide grooves 51 may be removed before the guide grooves 51 are formed, or in case of forming the clad layer 32, the outside areas of the "V"-shaped guide grooves 51 may be masked to prevent the clad layer 32 from being formed on those outside areas.

The optical waveguide 2 formed in generally "X"-shape is constituted by two optical waveguides of generally straight lines crossed each other at their middle points. Hereinafter, one of the two optical waveguides of generally straight lines will be referred to as first optical waveguide 52, and the other of the two optical waveguides of generally straight lines will be referred to as second waveguide 53. As is well known, the optical waveguide 2 is also formed by application of the photolithography technique and the etching technique.

Next, the optical waveguide device 50 constructed as described above is cut in two exact halves or chips along a line across the optical waveguide substrate 31 at substantially right angle thereto (in the direction perpendicular to the longitudinal direction of the optical waveguide substrate 31), the line passing through the intersection or junction between the first and second optical waveguides 52 and 53, in this example. This cutting process can be carried out by, for example, dicing. The cutting process provides first and second two optical waveguide chips each having a generally "V" or "U"-shaped optical waveguide formed by one of the halves of the first optical waveguide 52 and one of the halves of the second optical waveguide 53.

Figure 4:
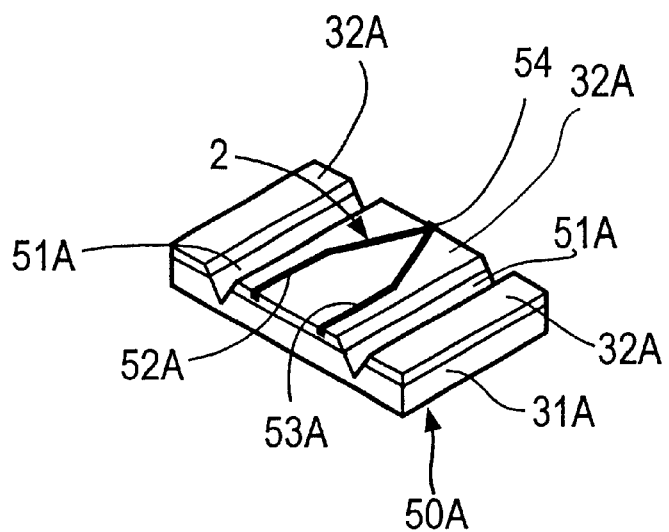
Figure 5:
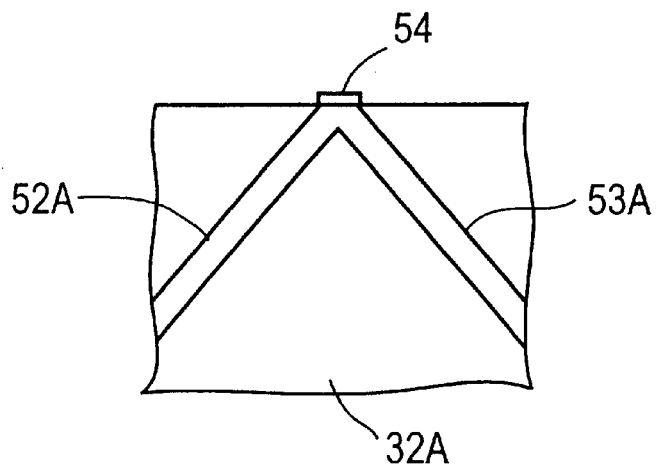

FIG. 4 is a perspective view showing, in outline, the construction of the first optical waveguide chip 50A that is one of the halves of the optical waveguide device 50 obtained by cutting it, and FIG. 5 is an enlarged plan view showing an area including the intersection between the first and second half optical waveguides forming a generally "V"-shape shown in FIG. 4. The first optical waveguide chip 50A comprises: a half optical waveguide substrate 31A; first and second half optical waveguides 52A and 53A forming a generally "V"-shape and formed on the surface of the half optical waveguide substrate 31A; a half clad layer 32A formed on the half optical waveguide substrate 31A in such manner that the first and second half optical waveguides 52A and 53A are covered with the half clad layer 32A; a dielectric multilayer film filter 54 formed by deposition of a dielectric multilayer film on an area of the end surface of the first optical waveguide chip 50A at the cut side thereof, the area including the intersection of the first and second half optical waveguides 52A and 53A exposed on the end surface of the half clad layer 32A; and two half guide grooves 51A of "V"-shape in section formed on both sides of the first and second half optical waveguides 52A and 53A forming a generally "V"-shape.

In this embodiment, the dielectric multilayer film filter 54 is formed by deposition of a dielectric multilayer film on the end surface area of the half clad layer 32A on which the intersection of the first and second half optical waveguides 52A and 53A are exposing. A dielectric multilayer filter of thin film previously formed may be fixed, by use of an adhesive, on the end surface area of the half clad layer 32A on which the intersection of the first and second half optical waveguides 52A and 53A are exposing. In such case, the dielectric multilayer film filter 54 may be provided only on the area of the end surface of the half clad layer 32A on which the intersection of the first and second half optical waveguides 52A and 53A are exposing, or it may be provided on all over the end surface of the first optical waveguide chip 50A including the end surface of the half clad layer 32A on which the intersection of the first and second half optical waveguides 52A and 53A are exposing. Alternatively, a dielectric multilayer filter of thin film previously formed may be secured by use of an adhesive in place of deposition of a dielectric multilayer film. Further, the thickness of the dielectric multilayer film filter 54 is very thin in reality, but it is shown in exaggeration in FIGS. 4 and 5 in order to show the existence of the filter 54 itself in these drawings.

Figure 6:
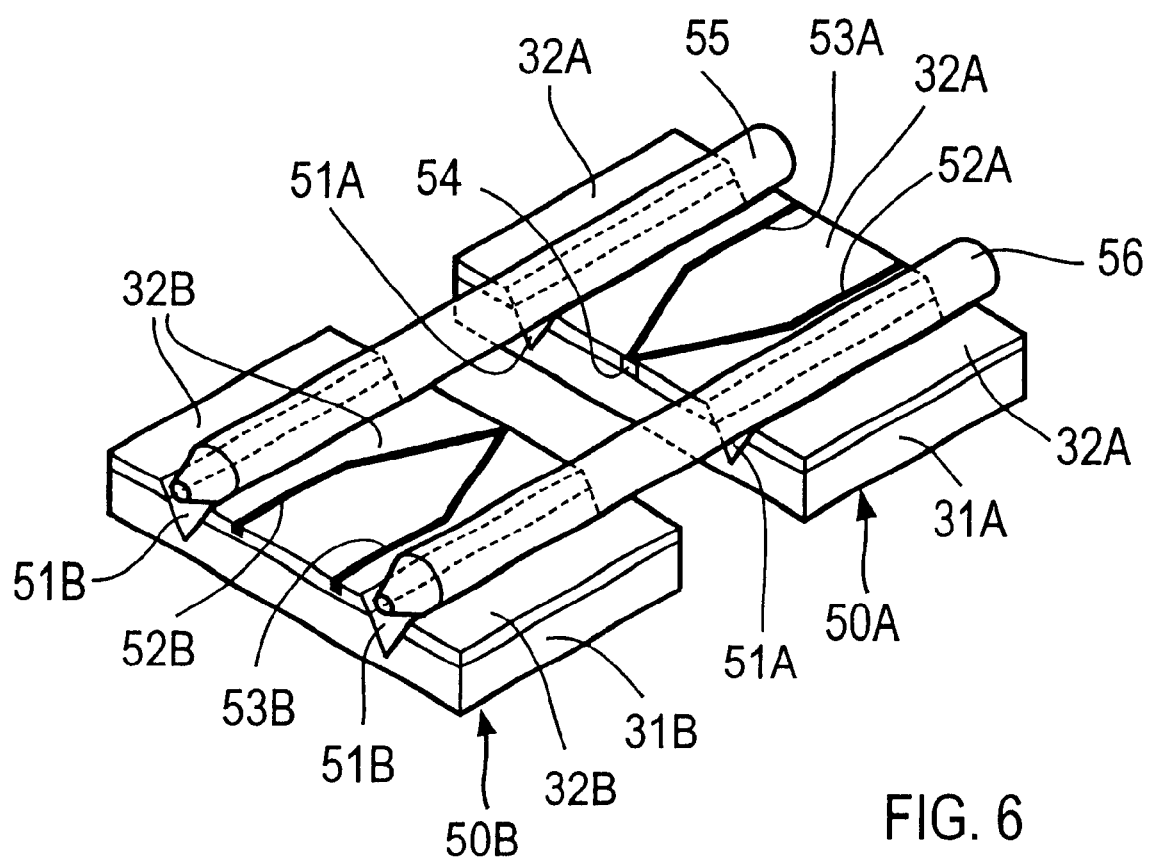

On the other hand, the second optical waveguide chip 50B that is the other of the halves of the optical waveguide device 50 obtained by cutting it, as shown in FIG. 6, comprises: a half optical waveguide substrate 31B; first and second half optical waveguides 52B and 53B forming a generally "V"-shape and formed on the surface of the half optical waveguide substrate 31B; a half clad layer 32B formed on the half optical waveguide substrate 31B in such manner that the first and second half optical waveguides 52B and 53B are covered with the half clad layer 32B; and two half guide grooves 51B of "V"-shape in section formed on both sides of the first and second half optical waveguides 52B and 53B forming a generally "V"-shape. Further, the first optical waveguide chip 50A is shown in FIG. 6 in the state that it is turned by 180 degrees from the state thereof shown in FIG. 4 (the first optical waveguide chip 50A is shown on the upper right side of FIG. 6).

Next, as shown in FIG. 6, the first optical waveguide chip 50A and the second optical waveguide chip 50B constructed respectively as described above are opposed to each other in the state that the intersection of the first and second half optical waveguides 52A and 53A exposed on the end surface of the half clad layer 32A of the first chip 50A is opposed to the intersection of the first and second half optical waveguides 52B and 53B exposed on the end surface of the half clad layer 32B of the second chip 50B with a predetermined space therebetween. For this end, at first, there are prepared two guide pins 55 and 56 each having a predetermined length. Each of the guide pins 55 and 56 is formed substantially in a straight line and has a shape and size (diameter) to be fitted in both of the "V"-shaped two guide grooves 51A and 51B of the first and second optical waveguide chips 50A and 50B. The guide pins 55 and 56 are fitted in the "V"-shaped guide grooves 51A and 51B of the first and second optical waveguide chips 50A and 50B opposed to each other with a predetermined space therebetween. By fitting the guide pins 55 and 56 in the "V"-shaped guide grooves 51A and 51B of the first and second optical waveguide chips 50A and 50B, the first and second optical waveguide chips 50A and 50B are aligned with each other in the state that the intersection of the first and second half optical waveguides 52A and 53A of the first chip 50A and the intersection of the first and second half optical waveguides 52B and 53B of the second chip 50B are opposed to each other.

Then, the first and second optical waveguide chips 50A and 50B are moved toward each other so that the intersection of the first and second half optical waveguides 52A and 53A abuts on the intersection of the first and second half optical waveguides 52B and 53B through the filter 54. Since the movement of the first and second optical waveguide chips 50A and 50B toward each other are conducted as they are guided by the guide pins 55 and 56, the first and second optical waveguide chips 50A and 50B are returned to substantially the same positional relation as the positional relation of them if the optical waveguide device 50 should not be cut. In such state, the first and second optical waveguide chips 50A and 50B are fixed to each other so that the optical waveguide device of the first embodiment is completed.

As described above, since the "V"-shaped guide grooves 51A and 51B can be formed such that the accuracy of mutual position between the "V"-shaped guide grooves 51A and 51B and the optical waveguides 52 and 53 is equal to or smaller than 0.2 $\mu$m, in the state that the first optical waveguide chip 50A and the second optical waveguide chip 50B are brought into contact with each other, the positional relation between the intersection of the first and second half optical waveguides 52A and 53A and the intersection of the first and second half optical waveguides 52B and 53B should also have high accuracy equal to or smaller than 0.2 $\mu$m. In other words, the intersection of the first and second half optical waveguides 52A and 53A and the intersection of the first and second half optical waveguides 52B and 53B should be opposed to and aligned with each other at high accuracy equal to or smaller than 0.2 $\mu$m.

Further, a recess having its depth and area corresponding to the thickness and area of the dielectric multilayer film filter 54 of the first optical waveguide chip 50A may be formed by a cutting work, for example, on an area of the end surface of the second optical waveguide chip 50B at the cut side thereof, the area including the intersection of the first and second half optical waveguides 52B and 53B exposed on the end surface of the half clad layer 32B at the cut side thereof. By forming such recess, when both the optical waveguide chips 50A and 50B are brought into contact with each other, a very small gap corresponding to the thickness of the dielectric multilayer film filter 54 cannot be produced between the optical waveguide chips 50A and 50B. Alternatively, as discussed above, if the dielectric multilayer film filter 54 is formed all over the end surface of the first optical waveguide chip 50A including the intersection of the first and second half optical waveguides 52A and 53A exposed on the end surface of the half clad layer 32A, the optical waveguide chips 50A and 50B are integrated through the dielectric multilayer film filter 54 put therebetween as one unit. As a result, it is unnecessary to form a recess on an area of the end surface of the second optical waveguide chip 50B including the intersection of the first and second half optical waveguides 52B and 53B.

With the construction as described above, the first and second optical waveguide chips 50A and 50B need not be aligned with each other by the active alignment process, that is, the first and second optical waveguide chips 50A and 50B can be aligned with each other at high accuracy by the passive alignment process. Consequently, a loss of light due to insertion of the filter 54 becomes very small, and the characteristic of the optical waveguide device can be greatly improved. Moreover, the optical waveguide device can be very easily manufactured, and hence all of the disadvantages of the prior art described above can be removed.

The optical waveguide device constructed as described above operates as a WDM device. For example, in case light having its wavelength $\lambda 1$ and light having its wavelength $\lambda 2$ are incident on the input end of the first half optical waveguide 52A of the first optical waveguide chip 50A, if the dielectric multilayer film filter 54 is set in its filter characteristic such that light having its wavelength $\lambda 1$ is reflected thereby and light having its wavelength $\lambda 2$ is transmitted therethrough, light having its wavelength $\lambda 1$ is reflected by the dielectric multilayer film filter 54, propagates through the second half optical waveguide 53A, and is emitted to the outside from the output end of the second half optical waveguide 53A. On the other hand, light having its wavelength $\lambda 2$ passes through the dielectric multilayer film filter 54, propagates through the first half optical waveguide 52B of the second optical waveguide chip 50B, and is emitted to the outside from the output end of the first half optical waveguide 52B.

Figure 7:
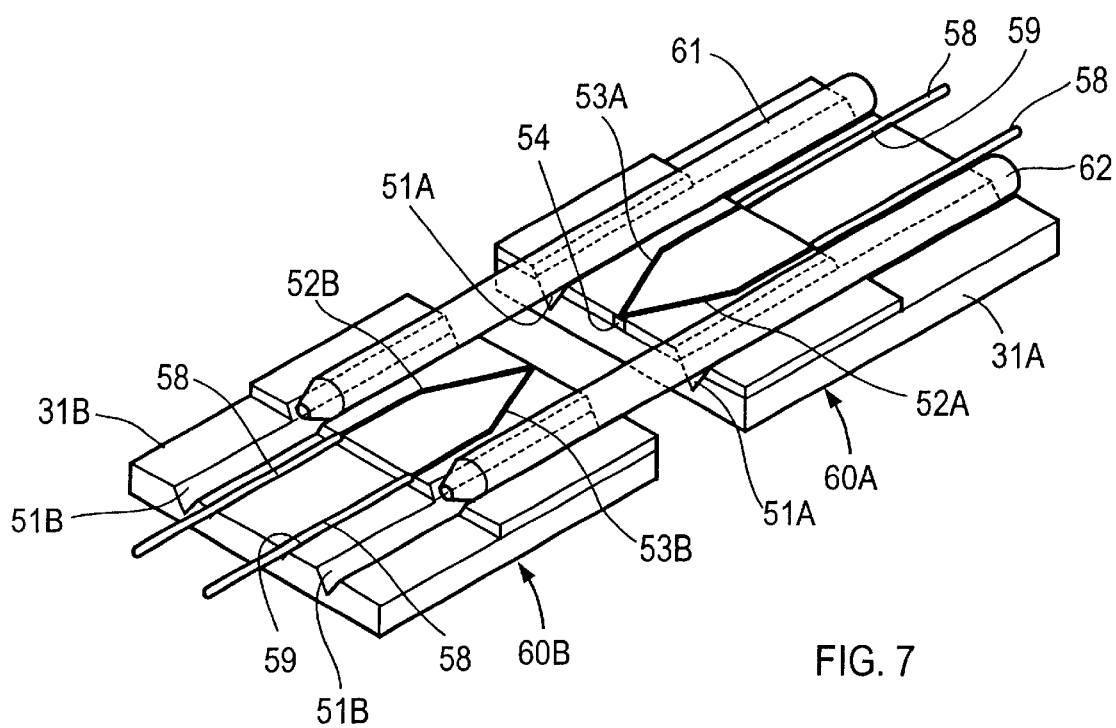
FIG. 7 is a perspective view showing, in outline, the construction of a second embodiment of the PLC type optical waveguide device according to the present invention.

FIG. 7 is a perspective view showing, in outline, the construction of a second embodiment of the PLC type optical waveguide device according to the present invention. This second embodiment is configured such that in the optical waveguide device 50 that forms the basis of the first embodiment shown in FIG. 3, the length of the optical waveguide substrate 31 in the longitudinal direction thereof is extended to have the extensions of the optical waveguide substrate 31 at both sides of the generally "X"-shaped optical waveguide 2 formed on the surface of the optical waveguide substrate 31 in the longitudinal direction thereof, and optical fibers are fixed on the extensions of the optical waveguide substrate 31 in the state that the optical fibers are opposed to the exposed end surfaces of the optical waveguide 2, respectively. Further, portions and elements in FIG. 7 corresponding to those in FIG. 6 will be denoted by the same reference characters affixed thereto, and the explanation thereof will be omitted unless it is necessary.

As shown in FIG. 7, the optical fibers 58 are fitted in and fixed to grooves 59 of "V"-shape in section for positioning optical fibers respectively, the grooves 59 being formed on the extensions of the optical waveguide substrate 31 in parallel with each other. These "V"-shaped grooves 59 are formed on the positions where the optical fibers 58 are opposed to and aligned with the exposed end surfaces of the first and second optical waveguides 52A, 52B and 53A, 53B respectively. In addition, the two guide grooves 51 of "V"-shape in section formed on the optical waveguide substrate 31 along the longitudinal direction thereof on both sides of the aforementioned generally "X"-shaped optical waveguide 2 in parallel with each other are also formed on the extensions of the optical waveguide substrate 31 at the same time. That is, the two guide grooves 51 of "V"-shape in section are formed all over the length of the optical waveguide substrate 31.

FIG. 7 illustrates the state that the optical waveguide device constructed as described above is cut in first and second two optical waveguide chips 60A and 60B which are the exact halves of the optical waveguide device in the direction of traversing the optical waveguide substrate 31 at substantially right angle thereto (in the direction perpendicular to the longitudinal direction of the optical waveguide substrate 31) as well passing through the intersection or junction between the first and second optical waveguides 52 and 53, the dielectric multilayer film filter 54 is formed by deposition of a dielectric multilayer film on an area of the end surface of the first optical waveguide chip 60A at the cut side thereof, the area including the intersection of the first and second half optical waveguides 52A and 53A exposed on the end surface of the half clad layer 32A at the cut side thereof, and thereafter, two guide pins 61 and 62 each having a predetermined length and being formed substantially in a straight line are fitted in both of the "V"-shaped two guide grooves 51A and 51B of the first and second optical waveguide chips 60A and 60B. By fitting the guide pins 61 and 62 in the "V"-shaped guide grooves 51A and 51B of the first and second optical waveguide chips 60A and 60B, the first and second optical waveguide chips 60A and 60B are aligned with each other in the state that the intersection of the first and second half optical waveguides 52A and 53A and the intersection of the first and second half optical waveguides 52B and 53B are opposed to each other, like the first embodiment. In this state, the first and second optical waveguide chips 60A and 60B are brought into contact with each other, and they are fixed to each other so that the optical waveguide device of the second embodiment is completed. Further, the details of the manufacturing steps are the same as those in the first embodiment and the explanation thereof will be omitted here.

With the construction as described above, the same function and effect as those in the first embodiment can be obtained as well as an advantage is further obtained that the exposed end surfaces of the first and second half optical waveguides 52A and 53A of the first optical waveguide chip 60A and the exposed end surfaces of the first and second half optical waveguides 52B and 53B of the second optical waveguide chip 60B can be optically coupled to the optical fibers 58 with ease respectively.

In the first and second embodiments, there have been shown the cases that after an optical waveguide device has been cut in two optical waveguide chips, a filter is attached to one of the optical waveguide chips, and then, the two optical waveguide chips are re-coupled in the state as if they have not been cut or separated. In case of an optical waveguide device that divides or multiplexes three or more lights having different wavelengths from one another, the optical waveguide device will be cut in three or more optical waveguide chips, a filter will be attached to required one or more of the optical waveguide chips, and then, the three or more optical waveguide chips are re-coupled.

Figure 8:
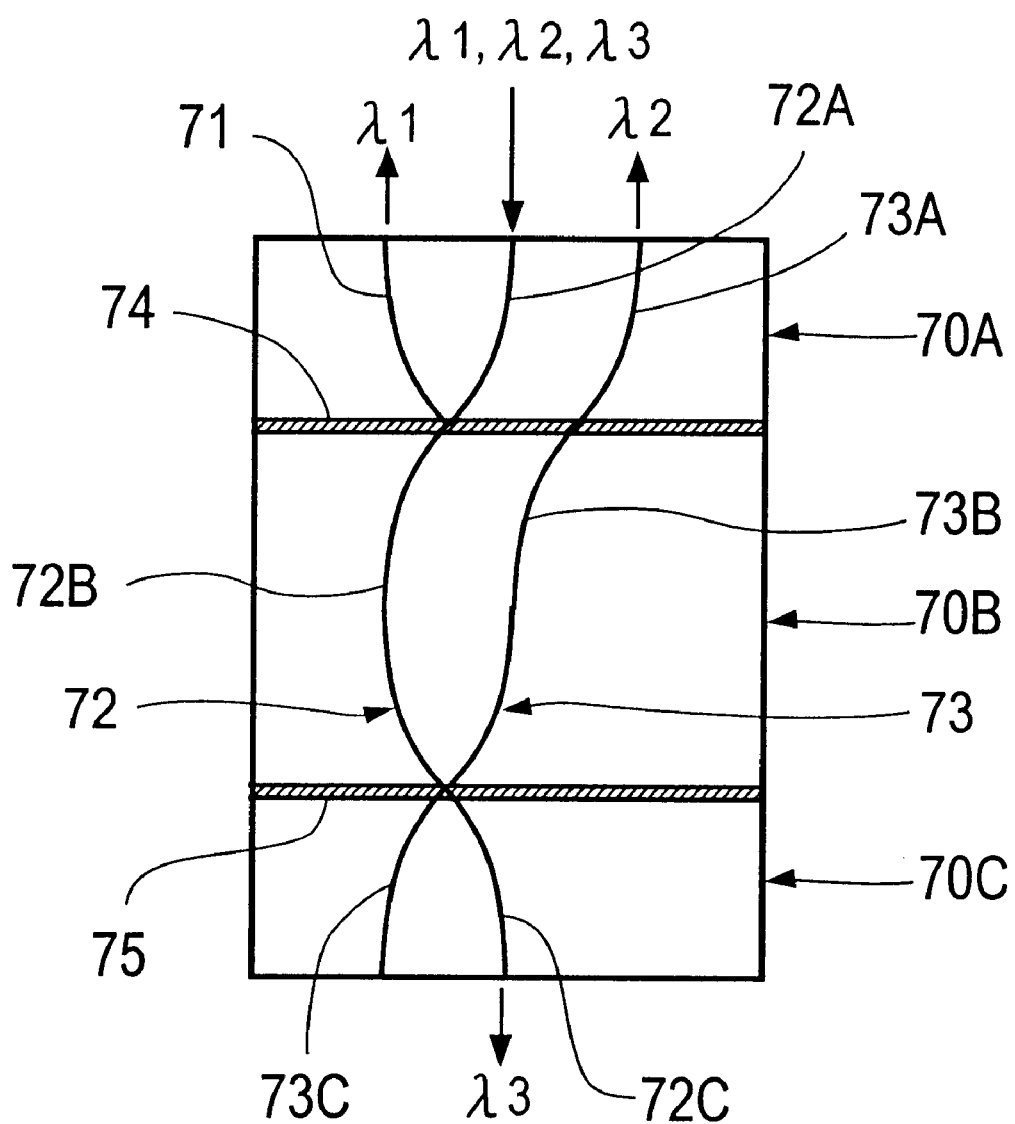
FIG. 8 is a plan view showing, in outline, a third embodiment of the PLC type optical waveguide device according to the present invention.

FIG. 8 is a plan view showing, in outline, a third embodiment in which the present invention is applied to an optical waveguide device for dividing or multiplexing three lights having different wavelengths from one another. The optical waveguide device is constituted by first, second, and third three optical waveguide chips 70A, 70B and 70C. The first optical waveguide chips 70A is separated from the optical waveguide device by cutting the optical waveguide device along a line across the optical waveguide substrate at substantially right angle thereto, the line passing through the intersection or junction between first and second optical waveguides 71 and 72. The second and third optical waveguide chips 70B and 70C are separated from each other by cutting the optical waveguide device along a line across the optical waveguide substrate at substantially right angle thereto, the line passing through the intersection or junction between the second optical waveguide 72 and a third optical waveguide 73.

Accordingly, the first optical waveguide chip 70A has the first optical waveguide 71, one end part 72A of the second optical waveguide 72 and one end part 73A of the third optical waveguide 73 formed thereon, the second optical waveguide chip 70B has the middle part 72B of the second optical waveguide 72 and the middle part 73B of the third optical waveguide 73 formed thereon, and the third optical waveguide chip 70C has the other end part 72C of the second optical waveguide 72 and the other end part 73C of the third optical waveguide 73 formed thereon.

These three optical waveguide chips 70A, 70B, and 70C are integrated as one unit as shown in FIG. 8 by the steps of: forming a first dielectric multilayer film filter 74 by deposition of a dielectric multilayer film on over all the end surface of the first optical waveguide chip 70A at the cut side thereof, on which the intersection of the first optical waveguide 71 and the one end part 72A of the second optical waveguide 72 is exposing as well as forming a second dielectric multilayer film filter 75 by deposition of a dielectric multilayer film on over all the end surface of the second optical waveguide chip 70B at the cut side thereof, on which the intersection of the middle part 72B of the second optical waveguide 72 and the middle part 73B of the third optical waveguide 73 is exposing; thereafter, like the first and second embodiments, fitting two guide pins not shown, each having a predetermined length and being formed substantially in a straight line, in the "V"-shaped two guide grooves not shown of each of the first, second and third optical waveguide chips 70A, 70B and 70C, thereby to align the first, second and third optical waveguide chips 70A, 70B and 70C with one another; and bringing the aligned first, second and third optical waveguide chips 70A, 70B and 70C into contact with one another and fixing them. Further, the details of the manufacturing steps are the same as those in the first embodiment and the explanation thereof will be omitted here.

The optical waveguide device constructed as described above operates as a WDM device for dividing or multiplexing three lights having different wavelengths from one another. For example, the first dielectric multilayer film filter 74 is set in its filter characteristic such that light having its wavelength $\lambda 1$ is reflected thereby and light having its wavelength $\lambda 2$ or $\lambda 3$ is transmitted therethrough, and the second dielectric multilayer film filter 75 is set in its filter characteristic such that light having its wavelength $\lambda 2$ is reflected thereby and light having its wavelength $\lambda 3$ is transmitted therethrough. In such filter characteristics, light having its wavelength $\lambda 1$, light having its wavelength $\lambda 2$ and light having its wavelength $\lambda 3$ are incident on the input end of the one end part 72A of the second optical waveguide 72 of the first optical waveguide chip 70A. Two lights having their wavelengths $\lambda 2$ and $\lambda 3$ pass through the first dielectric multilayer film filter 74 and are incident on the middle part 72B of the second optical waveguide 72 of the second optical waveguide chip 70B, and light having its wavelength $\lambda 1$ is reflected by the first dielectric multilayer film filter 74, and propagates through the first optical waveguide 71 and is emitted to the outside from the output end of the first optical waveguide 71. Light having its wavelength $\lambda 2$ in lights of wavelengths $\lambda 2$ and $\lambda 3$ propagating through the middle part 72B of the second optical waveguide 72 is reflected by the second dielectric multilayer film filter 75, and propagates through the middle part 73B and the one end part 73A of the third optical waveguide 73 and is emitted to the outside from the output end of the one end part 73A. While, only light of wavelength $\lambda 3$ passes through the second dielectric multilayer film filter 75, and propagates through the other end part 72C of the second optical waveguide 72 and is emitted to the outside from the output end of the other end part 72C. Thus, it will be understood that the optical waveguide device shown in FIG. 8 operates as a WDM device for dividing or multiplexing three lights having different wavelengths from one another.

In the third embodiment discussed above, it is apparent that the same function and effect as those in the first embodiment can be obtained, and the explanation thereof will be omitted.

In each of the above embodiments, silicon (Si) is used as an optical waveguide substrate, but any substrate made of other material such as glass substrate can be used as an optical waveguide substrate if guide grooves of "V"-shape in section for aligning a plurality of optical waveguides and a plurality of optical waveguide chips with each other can be formed thereon precisely. In case of using a glass substrate, "V"-shaped guide grooves for aligning a plurality of optical waveguide chips with each other can be formed by dicing (die-cutting). In addition, it is needless to say that patterns and/or materials of optical waveguides are not limited to those shown in the embodiments. Further, guide grooves for aligning a plurality of optical waveguide chips with each other may be modified in shape thereof in accordance with shape of guide pins fitting in the guide grooves, and hence the shape of the guide grooves is not limited to "V"-shape in section.

As is apparent from the foregoing, in accordance with the present invention, a plurality of separated optical waveguide chips can be aligned with and re-coupled to one another at high accuracy by passive alignment using at least one guide groove and guide pin. Consequently, a loss of light due to insertion of a filter or filters becomes much small, and the characteristic of an optical waveguide device can be greatly improved. Moreover, since the passive alignment is used, it is unnecessary to use X-Y-Z axis stage, a light source, an optical power meter, and the like, which results in reduction in manufacturing cost of an optical waveguide device. Furthermore, time and labor needed to manufacture an optical waveguide device can be remarkably reduced, and hence working efficiency is greatly improved. Thus, there are provided an optical waveguide device and a method of manufacturing the optical waveguide device that are capable of removing all of the disadvantages of the prior art described above.

While the present invention has been described with regard to the preferred embodiments shown by way of example, it will be apparent to those skilled in the art that various modifications, alterations, changes, and/or minor improvements of the embodiments described above can be made without departing from the spirit and the scope of the present invention. Accordingly, it should be understood that the present invention is not limited to the illustrated embodiments, and is intended to encompass all such modifications, alterations, changes, and/or minor improvements falling within the scope of the invention defined by the appended claims.

What is claimed is:

1. A method of manufacturing an optical waveguide device comprising the steps of:

forming an optical waveguide of a predetermined pattern on an optical waveguide substrate;

forming at least one guide groove on said optical waveguide substrate in the longitudinal direction thereof;

cutting the optical waveguide substrate having the optical waveguide and the guide groove formed thereon in the direction of traversing the optical waveguide substrate at substantially right angle thereto and passing through an intersection of the optical waveguide, thereby to form a plurality of optical waveguide chips;

providing a dielectric multilayer film filter on an end surface of at least one of the optical waveguide chips, on which the intersection of the optical waveguide is exposing;

fitting at least one guide pin in the guide groove of each of the plurality of optical waveguide chips in the state that the dielectric multilayer film filter is put between adjoining two optical waveguide chips, thereby to align the plurality of optical waveguide chips with one another; and bringing the aligned plurality of optical waveguide chips into contact with one another and fixing them.

2. The method as set forth in claim 1, further including a step of forming grooves for positioning optical fibers on both end portions of the optical waveguide substrate in the longitudinal direction thereof, on which the optical waveguide is not formed, said grooves being formed on the surfaces of the both end portions in the longitudinal direction of the optical waveguide substrate in the state that they are aligned with exposed end surfaces of the optical waveguide respectively.

3. The method as set forth in claim 1, wherein the step of forming at least one guide groove includes a step of forming two guide grooves of generally "V"-shape in section on both sides of the optical waveguide.

4. The method as set forth in claim 2, wherein the step of forming at least one guide groove includes a step of forming two guide grooves of generally "V"-shape in section on both sides of the optical waveguide.

5. The method as set forth in claim 1, wherein the optical waveguide and the guide groove are formed using photolithography technique and etching technique.

6. The method as set forth in claim 2, wherein the optical waveguide and the guide groove are formed using photolithography technique and etching technique.

7. The method as set forth in claim 1, wherein the step of forming at least one guide groove includes the steps of:

forming a mask of a predetermined pattern made of quartz system material on the surface of a clad layer covering the optical waveguide therewith using photolithography technique and etching technique; and applying an anisotropic etching using KOH liquid to form at least one guide groove of generally "V"-shape in section penetrating in the optical waveguide substrate from the surface of the clad layer.

8. The method as set forth in claim 1, wherein the at least one guide groove is formed by dicing.

9. The method as set forth in claim 1, wherein the step of providing a dielectric multilayer film filter includes a step of forming a dielectric multilayer film filter by deposition of a dielectric multilayer film on an end surface of one of the optical waveguide chips, on which the intersection of the optical waveguide is exposing.

10. The method as set forth in claim 2, wherein the step of providing a dielectric multilayer film filter includes a step of forming a dielectric multilayer film filter by deposition of a dielectric multilayer film on an end surface of one of the optical waveguide chips, on which the intersection of the optical waveguide is exposing.

11. The method as set forth in claim 1, wherein the step of providing a dielectric multilayer film filter includes a step of fixing a dielectric multilayer filter of thin film on an end surface of one of the optical waveguide chips, on which the intersection of the optical waveguide is exposing.

12. The method as set forth in claim 2, wherein the step of providing a dielectric multilayer film filter includes a step of fixing a dielectric multilayer filter of thin film on an end surface of one of the optical waveguide chips, on which the intersection of the optical waveguide is exposing.

13. An optical waveguide device comprising:

a plurality of optical waveguide chips formed by cutting an optical waveguide device comprising an optical waveguide substrate having an optical waveguide of a predetermined pattern formed thereon and at least one guide groove formed on the optical waveguide substrate in the longitudinal direction thereof, in the direction of traversing the optical waveguide substrate at substantially right angle thereto and passing through an intersection of the optical waveguide;

a dielectric multilayer film filter provided on an end surface of at least one of the optical waveguide chips, on which the intersection of the optical waveguide is exposing; and fixing means fixing the plurality of optical waveguide chips aligned with one another by use of the guide groove in the state that they are in contact with one another through the dielectric multilayer film filter put between adjoining two optical waveguide chips.

14. The optical waveguide device as set forth in claim 13, wherein the guide groove has a generally "V"-shape in section, and two such guide grooves are formed on both sides of the optical waveguide in the longitudinal direction of the optical waveguide substrate over the overall length thereof.

15. The optical waveguide device as set forth in claim 13, wherein grooves for positioning optical fibers are formed on both end portions of the optical waveguide substrate in the longitudinal direction thereof, on which the optical waveguide is not formed, said grooves being formed on the surfaces of the both end portions in the longitudinal direction of the optical waveguide substrate in the state that they are aligned with exposed end surfaces of the optical waveguide respectively.

16. The optical waveguide device as set forth in claim 14, wherein grooves for positioning optical fibers are formed on both end portions of the optical waveguide substrate in the longitudinal direction thereof, on which the optical waveguide is not formed, said grooves being formed on the surfaces of the both end portions in the longitudinal direction of the optical waveguide substrate in the state that they.are aligned with exposed end surfaces of the optical waveguide respectively.

17. The optical waveguide device as set forth in claim 13, wherein said dielectric multilayer film filter is a filter that is formed by deposition of a dielectric multilayer film on an end surface of one of the optical waveguide chips, on which the intersection of the optical waveguide is exposing.

18. The optical waveguide device as set forth in claim 13, wherein said dielectric multilayer film filter is a dielectric multilayer filter of thin film that is fixed on an end surface of one of the optical waveguide chips, on which the intersection of the optical waveguide is exposing.

* * * * *